Nov. 26, 1968   D. K. PORTER   3,413,174
CONVEYOR APPARATUS
Filed March 15, 1965   5 Sheets—Sheet 1
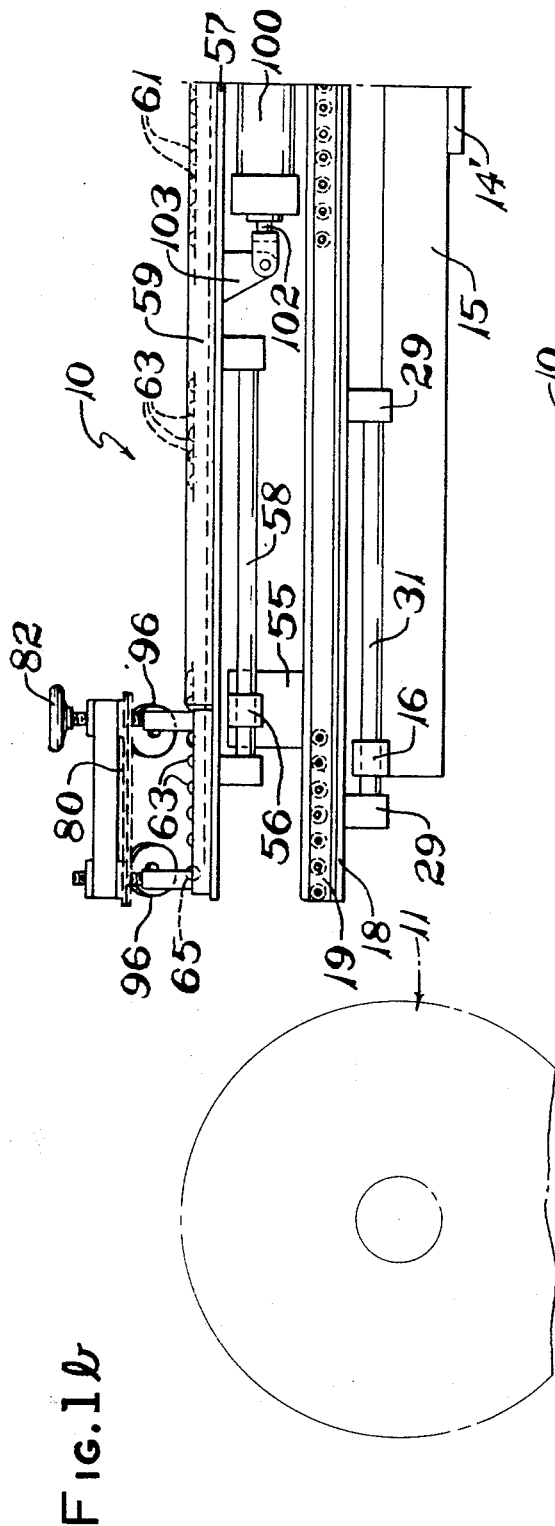
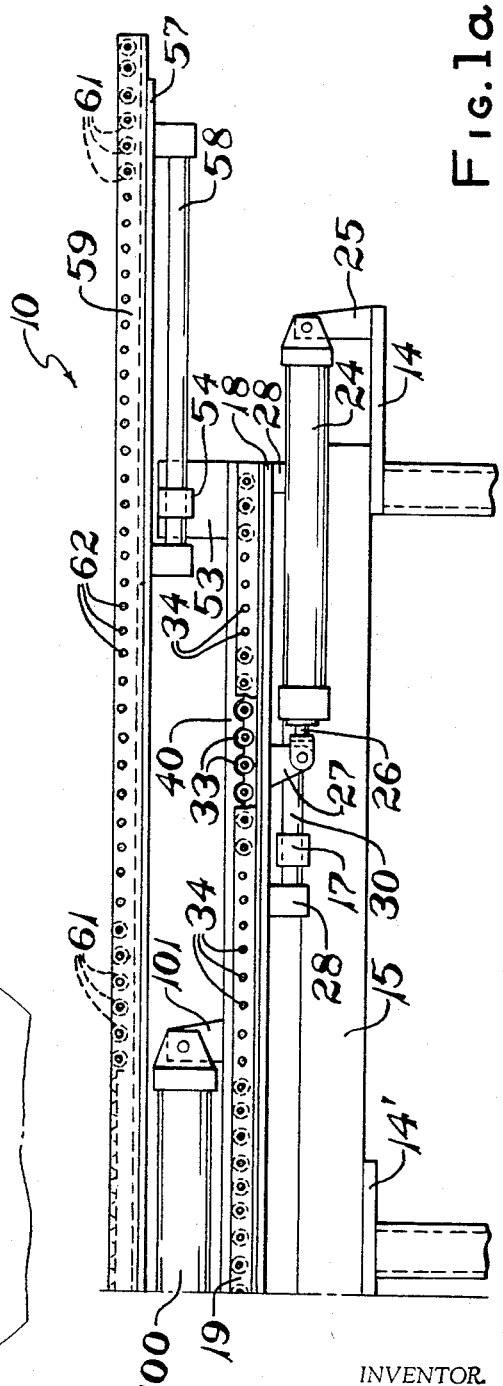
INVENTOR.
DONALD K. PORTER
BY Joseph Januszkiewicz
ATTY.

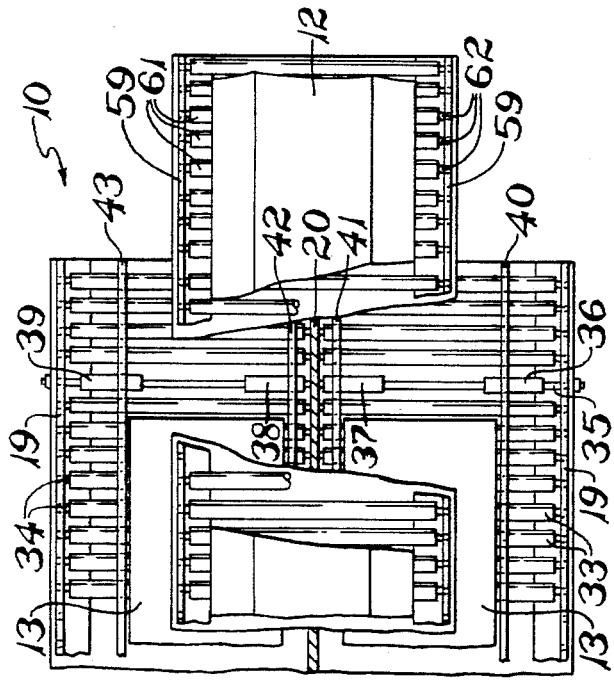

Nov. 26, 1968

D. K. PORTER 3,413,174

CONVEYOR APPARATUS

Filed March 15, 1965

INVENTOR.
DONALD K. PORTER
BY *Joseph Januszkiewicz*
ATTY.

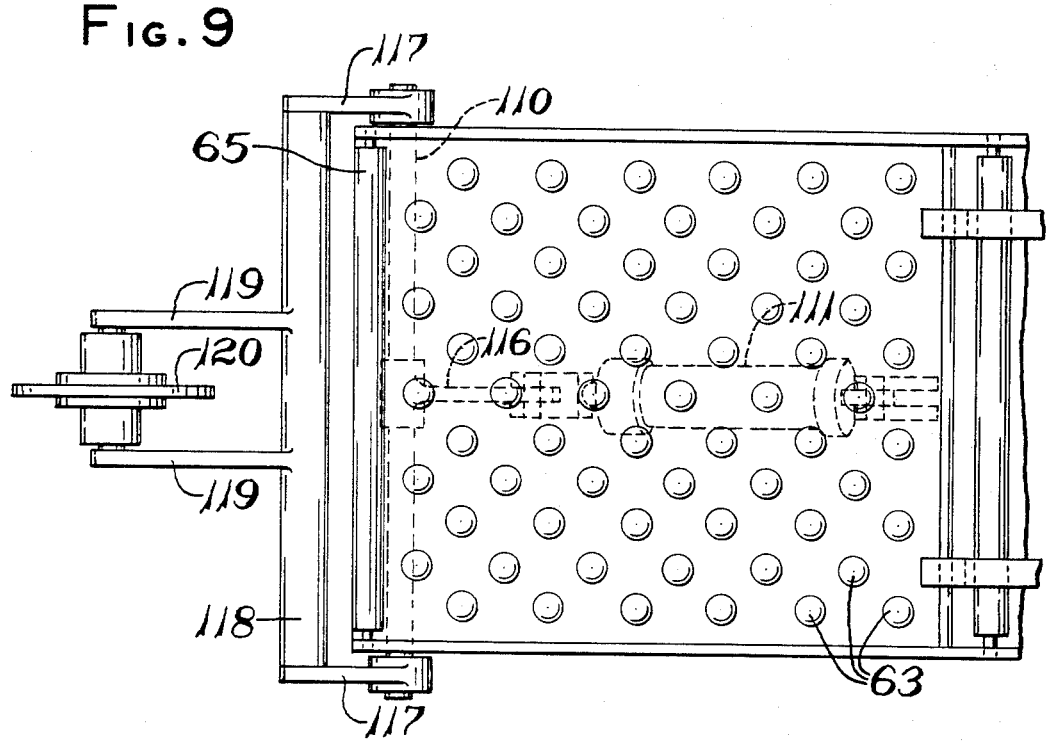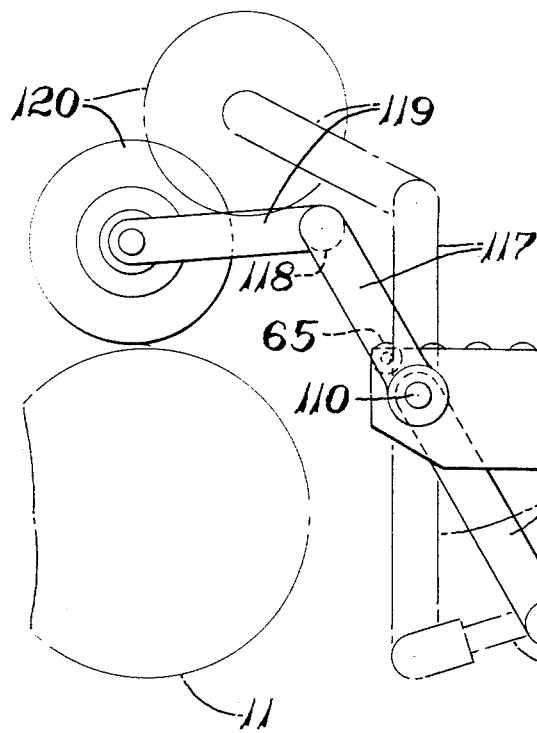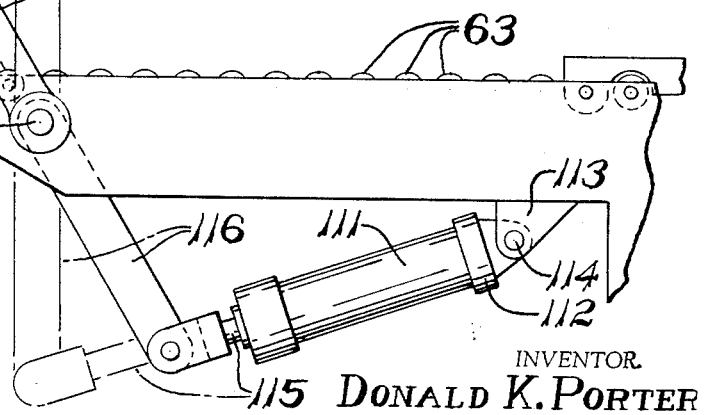

United States Patent Office 3,413,174
Patented Nov. 26, 1968

3,413,174
CONVEYOR APPARATUS
Donald K. Porter, Cuyahoga Falls, Ohio, assignor to The
B. F. Goodrich Company, New York, N.Y., a corporation of New York
Filed Mar. 15, 1965, Ser. No. 439,703
10 Claims. (Cl. 156—405)

ABSTRACT OF THE DISCLOSURE

A feed device for advancing tread stock comprising support means, said support means having a pair of longitudinal side bars stock conveying means mounted between said side bars for advancing tread stock, the upper conveying surface having a plurality of ball bearings, and means above said conveying means cooperative therewith to center a tread stock passing there-between.

---

This invention relates ot a feed device for delivering strip material to a tire building drum, and more particularly to a device for delivering tread stock and sidewall strips to a tire building drum.

In the manufacture of certain types of radial ply pneumatic tires, considerable manual handling of the tread and ply stock has been customary because of the nature of the construction of the tires and the process of building these tires. However, in order to effect economies in the manipulation of such strip material an apparatus was devised which provided selective and accurate positioning of such strip materials. In addition, means are provided to automatically center a flexible piece of stock for application to a carcass on the tire building drum.

Accordingly, it is an object of this invention to provide an improved transfer means for delivering plural strip material.

Another object of this invention is to provide novel means for centering a piece of elongated material having some degree of flexibility and deformation.

A further object of this invention is to provide novel means for centering an elongated strip of elastomeric material as it is fed by conveying means.

Still another object of this invention is to facilitate the more economic handling of strip material including tread stock.

These and other objects and advantages of the invention will hereafter more fully appear as this description proceeds in connection with the accompanying drawings:

In the drawings:

FIGS. 1a and 1b are side elevational views constructed in accordance with the principles of this invention, which when longitudinally aligned show the entire conveyor apparatus.

FIG. 2 is a plan view of the conveyor appaartus with portions thereof broken away for clarity.

FIG. 3 is a fragmentary front end view of the conveyor apparatus showing tread and sidewall strip pieces thereon.

FIG. 4 is a fragmentary sectional view of the adjusting means for the sidewall strip guide means taken along line IV—IV of FIG. 5.

FIG. 5 is a rear end view of the conveyor apparatus with portions omitted for clarity.

FIG. 6 is a detailed sectional view of the conveying means and adjustable sidewall strip guide means taken along line VI—VI of FIG. 4.

FIG. 9 is a plan view of the forward portion of a modification of the conveyor apparatus disclosing a device for aiding in the application of the tread onto the tire carcass of a tire building drum.

FIG. 10 is a side elevational view of the conveyor apparatus shown in FIG. 9.

Figure 7:
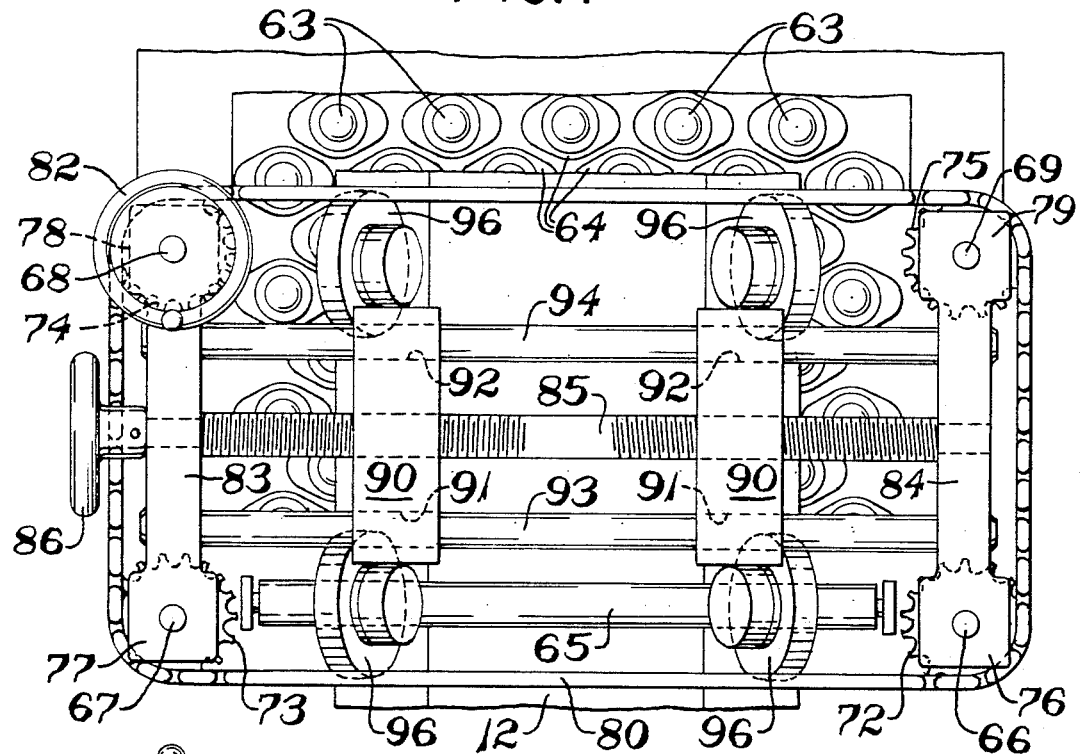
FIG. 7 is an enlarged plan view of the adjustable tread guiding means.

Referring now to the drawings, wherein like reference characters designate like or corresponding parts throughout the several views, there is shown in FIGS. 1 and 2 a conveyor apparatus 10 that is mounted on a suitable support structure to the rear of a tire building drum 11 to deliver tread stock 12 and sidewall strip stock 13 to the drum. The drum 11 is carried by a suitable frame. The support structure for the conveyor apparatus includes horizontally disposed plates 14 and 14′ (FIG. 1a) and an elongated tubular support 15 as well as suitable foundation supports, not shown. A forwardly and rearwardly disposed upper surface portion of the tubular support 15 has secured thereto laterally extending brackets 16 and 17 (FIGS. 3 and 5), respectively, which brackets have bores extending horizontally therethrough to serve as guide means for the slide bars to be described.

Mounted for movement above tubular support 15 is a lower conveyor unit having a support framework or structure 18 (FIGS. 1a and 3) which has secured to its respective edge portions spaced parallel angle brackets 19 and a central bracket 20 parallel to such brackets 19 and equidistant therefrom. Hydraulic cylinders 24 have their cylinder end secured via brackets 25 to plate 14 and have their cylinder rods 26 secured via brackets 27 to the supporting framework 18 of the lower conveyor unit.

The supporting framework or structure 18 has pairs of bosses 28—28 secured to the underneath portion at the rearwardly disposed end thereof and pairs of bosses 29—29 secured to the underneath portion of the forwardly disposed end portion thereof. Slide bars 30 and 31 are secured to the respective pairs of bosses 28 and 29 with such slide bars 30 being slideably guided in the bore of the bracket 17 and the slide bars 31 slideably guided by the bores of the bracket 16. Pressurization of the head end of hydraulic cylinders 24 extend the rods 26, which are secured to the supporting framework 18 of the lower conveyor unit to thereby urge such lower conveyor unit forwardly or as viewed in FIGS. 1a and 1b in a leftward direction to position the forward end thereof closely adjacent the tire building drum.

Pressurization of the rod end of hydraulic cylinders 24 effects the return of the lower conveying unit rearwardly away from the tire building drum 11. The angle brackets 19 in cooperation with the central bracket 20 supports a plurality of longitudinally spaced transversely disposed conveyor rollers 33 mounted on shafts 34. In place of certain of the transversely disposed rollers 33, angle brackets 19 and bracket 20 support transversely disposed shafts 35 on which are slideably mounted adjustable blocks 36, 37, 38 and 39 (FIGS. 2 and 6). Each block has a rack on its lower portion. Blocks 36, 37, 38 and 39 have secured thereto parallel guide rails 40, 41, 42 and 43, respectively. Such guide rails are parallel to the longitudinally extending brackets 19 and central bracket 20 and are movable upon actuation of the respective racks in a manner to be described. Each guide rail has a scalloped bottom edge, including a series of arcuate grooves to receive a portion of the rollers 33. The rearwardly disposed portions of structure 18 have secured thereto a plurality of spaced brackets 47 (FIG. 4). Each bracket 47 journals one end of a shaft 48. Each shaft 48 has keyed thereto a gear 49, which gear 49 meshes with respective racks on blocks 36, 37, 38 and 39. Each shaft 48 has a hand wheel 51 secured thereto for rotating such shaft and its respective gear 49 to move the rack meshing therewith. Such action effects adjustment of the guide rail connected thereto to assure proper alignment of the sidewall strip being delivered between adjacent pairs of guide rails 40 and 41 or 42 and 43. Secured to the rearwardly-most end portion of the bracket 20 is an upwardly extending bracket 53 which bracket 53 supports a pair of laterally disposed brackets 54 (FIG. 5) having bores extending horizontally therethrough. Secured to the forwardly-most end portion of central bracket 20 is an upwardly extending bracket 55, which bracket 55 supports a pair of laterally extending brackets 56, having bores extending horizontally therethrough substantially in line with the bores of the brackets 54.

Figure 8:
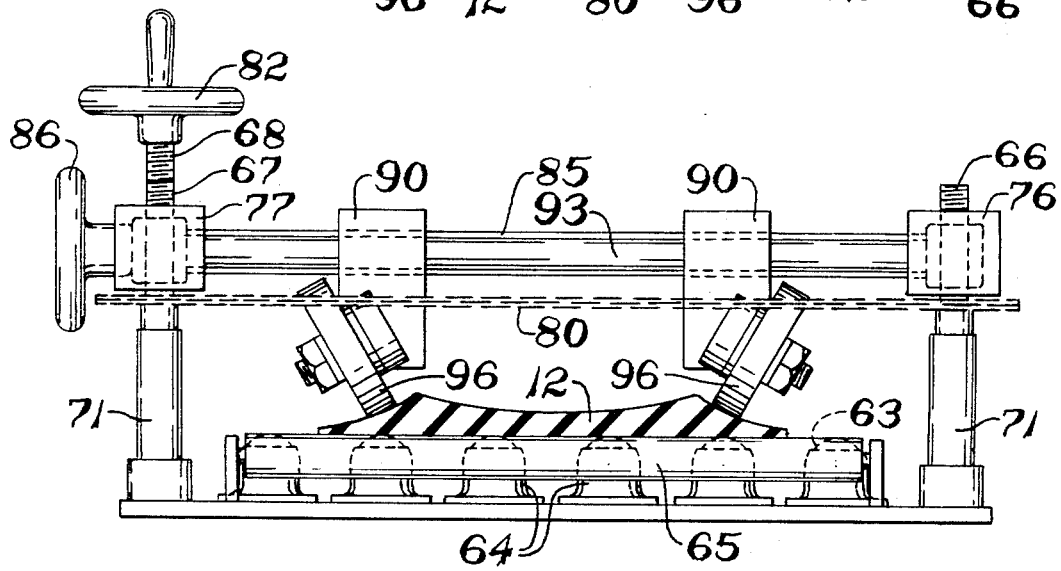
FIG. 8 is a front end view of the adjustable tread guiding means.

Mounted for movement on the lower conveyor unit is an upper conveyor unit, which upper conveyor unit has a supporting framework or structure 57. Structure 57 has secured to its underneath surface a pair of slide bars 58 which are slideably received by the bores of brackets 54 and 56. Structure 57 has secured to its respective edge portions spaced angle brackets 59. The respective angle brackets 59 support a plurality of longitudinal spaced transversely disposed rollers 61 mounted on shafts 62. The forward end portion of the upper conveyor unit has a plurality of ball bearings 63 mounted in suitable housings 64 in lieu of the rollers 61. The upper edge portions of the ball bearings 63 are substantially in line with the upper surface portion of the conveyor roller 61 to facilitate the handling of a tread stock. Forwardly of the ball bearings 63 and closely adjacent the forward-most end portion of such upper conveyor unit is a conveyor roller 65 (FIG. 7). Also located on the forward portion of the upper conveyor unit are four upwardly extending shafts 66, 67, 68 and 69 (FIGS. 7 and 8) journalled in suitable housings indicated generally as 71. Shafts 66 and 67 are located on the forward-most end portion of the upper conveyor unit whereas shafts 68 and 69 are disposed rearwardly of such shafts straddling the ball bearings 63. Respective shafts 66, 67, 68 and 69 have threaded portions which are engaged by the internal threaded portion of sprocket wheels 72, 73, 74 and 75, respectively. Sprockets 72 through 75, inclusive, are journalled in blocks 76, 77, 78 and 79, respectively, for rotation therein but movable vertically therewith. A chain 80 meshes with such sprockets 72 through 75 to insure simultaneous rotation of such sprockets upon rotation of any one of such sprockets. A handwheel 82 attached to the end portion of sprocket 74 as shown in FIG. 7 provides rotation of sprocket 74 and causes the simultaneous rotation of all the sprocket wheels which causes such simultaneous vertical adjustment of the blocks 76 through 79, inclusive. Extending between blocks 77 and 78 and connected thereto is a crossbar 83 movable in a vertical direction therewith. Extending between blocks 76 and 79 and connected thereto for vertical adjustment therewith is a crossbar 84. The intermediate portions of crossbars 83 and 84 have a bore which journals a threaded shaft 85 for rotation. A handwheel 86 is connected to one end of the shaft 85, which shaft 85 has its opposite end portions threaded in opposite directions. A pair of spaced cross slides 90 are threadedly engaged by such spaced threaded portions of shaft 85. Since shaft 85 has its opposite end portions threaded in opposite directions, rotation of handwheel 86 will cause the cross slides 90 to approach each other or move in opposite directions in accordance to the direction of rotation of shaft 85. Each cross slide 90 has a pair of bores 91 and 92 whose longitudinal center line is parallel to the axis of shaft 85. The crossbars 83 and 84 support the respective end portions of a pair of spaced parallel guide bars 93 and 94 which extend through the bores 91 and 92 of cross slides 90 to guide the reciprocal adjustment movement of such cross slides 90. The respective end portions of each cross slide 90 support a guide roll 96 which is angularly adjustable thereon. Such guide rolls 96 cooperate with the universally moving ball bearings 63 to adjust the longitudinal center line of the tread as it passes therebetween.

A hydraulic cylinder 100 has its head end secured via a bracket 101 to the center bracket 20, and has its rod 102 secured by a bracket 103 to the supporting structure or framework 57. Pressurization of the head end of hydraulic cylinder 100 extends rod 102 in a leftward direction as viewed in FIG. 1b which moves the upper conveyor unit leftwardly to move the forward-most end portion closely adjacent to the upper end portion of the tire building drum 11 to facilitate the withdrawal of the tread from such conveyor unit for delivery to the tire building drum 11.

In the operation of the tread and sidewall ply transfer unit the head end of hydraulic cylinder 24 is initially pressurized to move the conveyor apparatus 10 leftwardly as viewed in FIG. 1a and 1b which positions the forward portion thereof closely adjacent the tire building drum to facilitate the removal of the sidewall strips from the conveyor balls 63, respectively. The guide rails 40, 41 and 42, 43 guide such sidewall strips into position on a tire building drum. The adjustment of the guide rails 40, 41 and 42, 43 has been heretofore adjusted by manipulation of the handwheel which rotates the shaft 48 and the gear 49 to transversely position the blocks 36, 37, 38 and 39 and the guide rail connected thereto. The adjustment of such rails accurately guides the lateral side of each portion of the sidewall strips for their application onto the tire carcass. The rod end of hydraulic cylinder 24 is then pressurized to move the conveyor apparatus 10 away from the tire building drum to facilitate other manipulative steps until such time that the tread is to be applied to the tire carcass. The head end of hydraulic cylinder 100 is then pressurized to move the upper conveyor unit leftwardly as viewed in FIG. 1b to move the forward-most end portion closely adjacent the upper-end portion of the tire building drum 11. The tread 12 is then withdrawn from the upper conveyor unit such that its laterally inclined side portions are engaged by the guide rolls 96 which center such tread to assure the longitudinal alignment of such tread with the tire carcass being built. Proper lateral alignment of the guide rolls 96 is effected by the rotation of hand wheel 86 which rotates threaded shaft 85 which positions the cross slides 90 and the guide rolls 96 through the vertical adjustment of the crossbars 83 and 84, inclusive, by the rotation of handwheel 82 which moves the respective sprockets 76 through 79, inclusive, and their supporting crossbars 83 and 84 which carries with it guide bars 93 and 94 and the cross slides 90 and the guide rolls 96.

A modification of the forward portion of the conveyor apparatus is shown in FIGS. 9 and 10 wherein a pivot shaft 110 is mounted on the forward portion of the upper conveyor unit, but below roller 65.

A hydraulic cylinder 111 has its cylinder head end portion 112 secured to a bracket 113 via pivot means 114 and has its rod 115 secured to one end of a lever 116. The other end of lever 116 is keyed or otherwise secured to the intermediate portion of pivot shaft 110 whereby pressurization of the head end of hydraulic cylinder 111 moves rod 115 leftward and downward as viewed in FIG. 10 to the position shown in phantom lines. The other ends of shaft 110 have one end of levers 117 secured thereto for pivotal movement therewith. The outer end of levers 117 journal the ends of an elongated rod 118, which rod 118 has a pair of spaced brackets 119 secured thereto. The distal end of each bracket 119 supports for rotation a roller 120 that is adapted to be pressed against the tread stock on the tire building drum serving to press such tread stock into adherence with the tire carcass. The pressure maintained via roller 120 assures the proper tensioning of the tread stock as it is applied onto the tire carcass. Such modification is shown on the upper conveyor unit, and may be made with or without the lower conveyor unit. A further explanation of the operation of the hydraulic cylinder 111 and its effect on roller 120 is not deemed necessary in view of the above description.

Obviously many modifications and variations of the present invention are possible in the light of the above teachings. It is therefore to be understood, that within the scope of the appended claims, the invention may be practiced otherwise than as specifically described.

What is claimed is:

1. A feed device for advancing and centering tread stock comprising support means, said support means having a pair of longitudinal side bars, stock supporting rollers mounted between said bars for advancing tread stock, the forward portion of said support means having a plurality of ball bearings with their upper conveying surface substantially in line with the upper conveying surface of said rollers, the forward-most end portion of said support means having a first pair of laterally spaced brackets closely adjacent said respective side bars, a second pair of laterally spaced brackets mounted closely adjacent said first pair of brackets, said second pair of brackets mounted closely adjacent said respective side bars, a sprocket journalled on each of said brackets, each of said brackets having a vertically extending threaded screw, each of said sprockets being internally threaded to receive a portion of said screw journalled in said bracket associated therewith, each of said sprockets adjacent common side bars being connected by a crossbar for vertical movement together, means operatively connecting said sprockets for rotating said sprockets simultaneously to move said sprockets and crossbars in vertical planes, a pair of cross slides supported by said crossbars for vertical adjustment movement therewith, and each cross slide having a pair of angular disposed rollers mounted thereon for cooperation with said ball bearings to center and guide a tread stock therebetween.

2. A feed device for advancing and centering tread stock as set forth in claim 1 wherein said cross slides are adjustably mounted on said crossbars for movement in linear opposite directions relative to each other, which direction is normal to said vertical adjustment movement of said crossbars.

3. A feed device as set forth in claim 2 wherein power operated means are connected to said support means for selectively moving said support means linearly into and out of operative position with a tire building drum.

4. A feed device for advancing strip stock comprising a support means; a first conveyor unit having a longitudinal center line movably supported on said support means; power operated means operatively connected between said support means and said first conveyor unit for moving said first conveyor unit in the direction of said longitudinal center line; a second conveyor unit having a longitudinal center line parallel to said center line of said first conveyor unit movably mounted on said first conveyor unit; power operated means operatively connected between said first conveyor unit and said second conveyor unit for advancing said second conveyor unit in said longitudinal direction; and said second conveyor having adjustable strip centering means mounted on the forward portion thereof cooperative therewith for centering a tread stock advancing over said second conveyor unit.

5. A feed device for advancing strip stock as set forth in claim 4 wherein said first conveying means has a central bar located on said longitudinal center line, at least two pairs of laterally spaced guide means mounted on said first conveying means with one pair of said guide means on opposite sides of said center line; and means operatively connected to said guide means for adjusting said guide means laterally toward and away from said center line.

6. A feed device as set forth in claim 4 wherein said second conveyor unit has a pair of longitudinally extending side bars for guiding stock in said longitudinal direction, said side bars extending in a direction parallel to said longitudinal direction, the forward portion of said second conveyor unit having a plurality of ball bearings with upper conveying surfaces, said upper conveying surfaces of said ball bearings being in substantial line with the upper conveying surface of said second conveyor unit, and said ball bearings cooperative with said adjustable strip centering means on the forward portion of said second conveyor unit to center and guide a tread stock therebetween.

7. A feed device for advancing strip stock as set forth in claim 6 where said first conveying means has a central bar located on said longitudinal center line; a pair of longitudinally extending guide bars mounted on opposite sides of said central bar and being parallel thereto; each of said pairs being laterally spaced from each other to convey a strip of material therebetween.

8. A feed device for advancing strip stock as set forth in claim 7 wherein a stitching wheel is mounted on the forward portion of such second conveyor unit; and a hydraulic cylinder operatively mounted on said second conveyor unit being connected to said stitching wheel for selectively pivoting such stitching wheel into stitching relationship with a tire building drum mounted closely adjacent such feed device.

9. A feed device for advancing strip material to a rotatable building drum comprising a support; a first conveyor unit movably mounted on said support; hydraulic cylinder means interconnecting said first conveyor unit and said support means for moving said conveyor unit in a longitudinal direction which is normal to the axis of rotation of such building drum, said conveyor unit having a central bar extending in said longitudinal direction, said central bar dividing said first conveyor unit into a first and second portion, each portion of said conveyor unit having a plurality of spaced rollers extending in a direction normal to said longitudinal direction, each of said portions having at least a pair of spaced guide bars which guide bars are cooperative with said rollers to advance a strip of material onto a tire building drum, means on said first conveyor unit operatively connected to said guide bars for adjusting the lateral position thereof relative to said central bar, a second conveyor unit movably mounted on said first conveyor unit, hydraulic cylinder means interconnecting said first and second conveyor units for moving said second conveyor unit in a longitudinal direction normal to the axis of rotation of such building drum, said second conveyor unit having longitudinally extending side bars on the edges thereof, said side bars extending in a direction parallel to said longitudinal directions, rollers mounted between said side bars, said rollers having their axes parallel to such axis of rotation of such building drum, the forward portion of said second conveyor means having a plurality of ball bearing transfer means, the upper surface of said ball bearing means being in line with the upper surface of said rollers of said second conveyor unit, centering means mounted on said forward portion of said second conveyor unit, said centering means including a pair of vertically adjustable cross slides supporting friction rollers cooperative with said ball bearing transfer means for centering a tread passing therebetween, and means operatively connected to said cross slides for moving said cross slides in opposite directions relative to each other to adjust the lateral spacing thereof.

10. A feed device for advancing strip material as set forth in claim 9 wherein a stitching roller is mounted on a pivot means closely adjacent said centering means, and a hydraulic cylinder mounted on said second conveyor unit is operatively connected to said pivot means for swinging said stitching roller into operative engagement with a tire building drum closely adjacent the forward portion of such feed device.

References Cited

UNITED STATES PATENTS 1,665,831    4/1928    Williams         156—405 X (Other references on following page)

UNITED STATES PATENTS

| | | | |
|---|---|---|---|
| 1,915,147 | 6/1933 | Barder et al. | 156—406 X |
| 2,346,439 | 4/1944 | Leguillon | 156—405 |
| 2,588,207 | 3/1952 | Cleland et al. | 156—126 |
| 2,832,396 | 4/1958 | Harris | 156—406 |
| 3,038,524 | 6/1962 | Bosomworth | 156—405 |
| 3,071,179 | 1/1963 | Tourtellotte et al. | 156—405 |
| 3,170,829 | 2/1965 | Batten | 156—405 |

FOREIGN PATENTS 586,954  4/1947  Great Britain.

EARL M. BERGERT, *Primary Examiner.*

C. B. COSBY, *Assistant Examiner.*